United States Patent [19]

Knapp

[11] Patent Number: 4,599,027
[45] Date of Patent: Jul. 8, 1986

[54] METHOD AND APPARATUS FOR MOVING CARGO BETWEEN A SHIP AND A DOCK

[75] Inventor: Richard N. Knapp, Norfolk, Va.

[73] Assignee: Virginia International Terminals, Inc., Norfolk, Va.

[21] Appl. No.: 712,047

[22] Filed: Mar. 15, 1985

[51] Int. Cl.$^4$ ............................................. B65G 63/00
[52] U.S. Cl. ................................... 414/139; 212/208; 212/210; 212/234; 414/496; 414/561; 414/786
[58] Field of Search ............... 414/137, 139, 140, 145, 414/284, 496, 561, 786; 212/208, 210, 233, 234

[56] References Cited

U.S. PATENT DOCUMENTS

| | | | |
|---|---|---|---|
| 1,192,016 | 7/1916 | Stuart | 212/208 X |
| 1,373,464 | 4/1921 | Titcomb | 212/210 X |
| 2,050,821 | 8/1936 | Vercoe | 414/496 |
| 3,168,955 | 2/1965 | Black | 414/140 X |
| 3,812,987 | 5/1974 | Watatani | 414/139 X |
| 3,958,106 | 5/1976 | Bedford et al. | 414/139 X |
| 4,046,265 | 9/1977 | Wormmeester et al. | 414/139 |
| 4,106,639 | 8/1978 | Montgomery et al. | 414/139 |
| 4,172,685 | 10/1979 | Nabeshima et al. | 414/140 X |
| 4,293,077 | 10/1981 | Makino | 414/139 X |

FOREIGN PATENT DOCUMENTS 2303743 10/1976 France ..................... 414/139

Primary Examiner—Leslie J. Paperner
Attorney, Agent, or Firm—Beveridge, DeGrandi and Weilacher

[57] ABSTRACT

Cargo containers are moved between a dock and a ship by a crane which has a vertically movable landing platform, a waterside trolley for moving cargo between the ship and the landing platform, and a landside trolley for moving cargo between the dock and the landing platform. The landing platform is moved to different elevations to change the extent of vertical movement performed on the cargo by each of the tolleys. In the course of operations, the landing platform is movable to an elevation which corresponds approximately to the higher of: (a) the elevation of the designated location on the ship where the article of cargo is to loaded or unloaded, or (b) the elevation of the highest obstacle between the dock and the designated location; and, both trolleys are operated while the landing platform is at this elevation.

9 Claims, 1 Drawing Figure

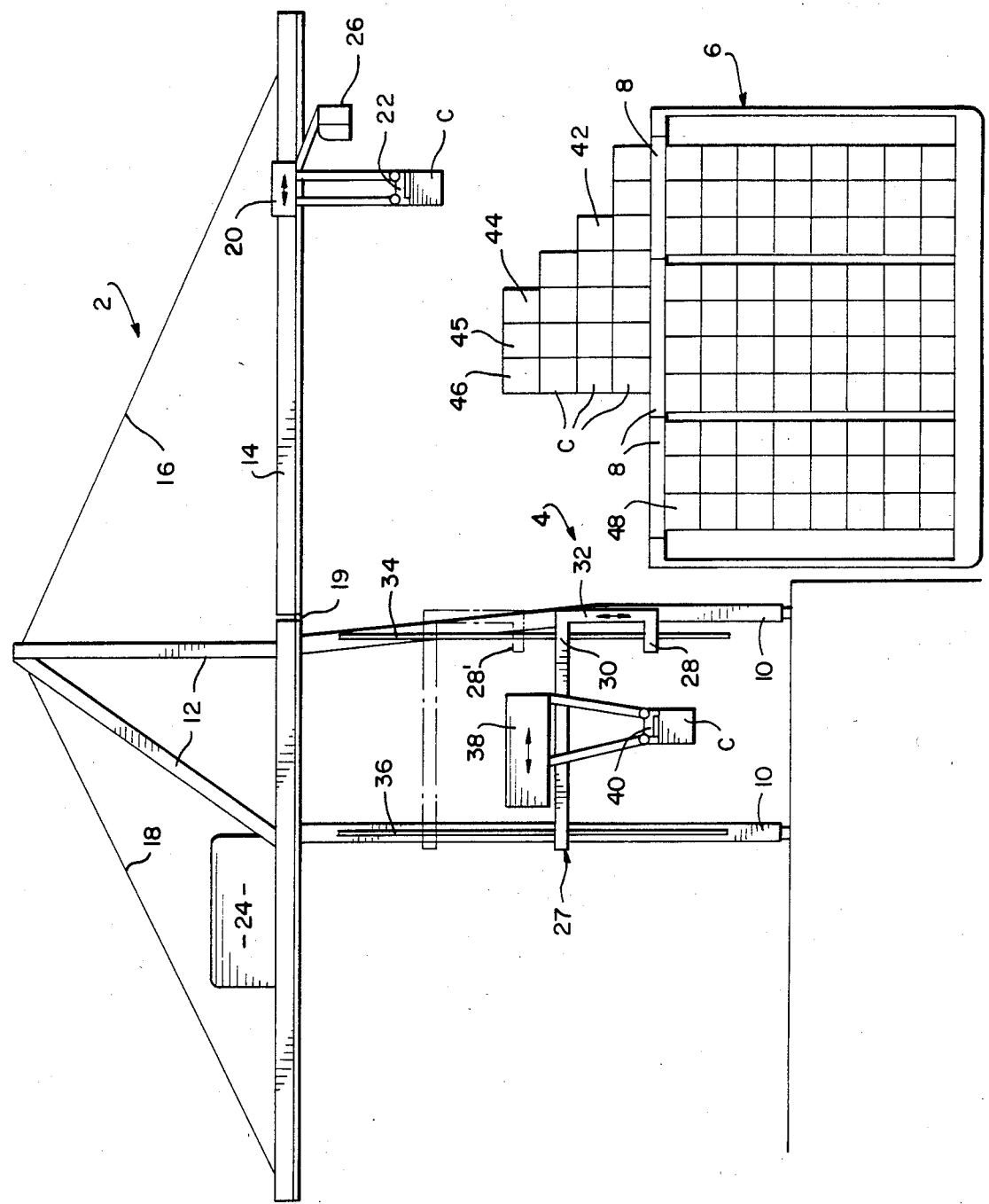

METHOD AND APPARATUS FOR MOVING CARGO BETWEEN A SHIP AND A DOCK

BACKGROUND

This invention relates to improvements in the construction and operation of cranes for moving cargo between a dock and a ship.

Recent decades have seen major changes in the handling of seagoing cargo. The most notable development in this respect has been the evolution and utilization of container ships and container cranes. Container ships are configured and equipped to carry their cargo in large rectangular containers which have standardized dimensions facilitating their stacking and handling. A typical container crane is a large quayside gantry crane, movable lengthwise on the dock on railroad-like rails. The crane has a large horizontal beam which extends over a ship moored alongside a dock. A horizontally movable carriage or trolley rides on the horizontal beam, and wire ropes on the trolley suspend a spreader which is designed to engage the upper regions of containers. Such engagement may be made by means of twist lock mechanisms, examples of which are disclosed in Loomis et al U.S. Pat. No. 3,749,438. The trolley is operated to carry cargo the entire vertical and horizontal distances between the dock and the ship.

A shortcoming of the typical container crane described above is that, due to the distances the containers must travel, the cycle time is too long. Operating the trolley at a higher velocity is helpful but it cannot, as a practical matter, provide a major increase in the per hour capacity of the crane. Realizing this situation, others have proposed the utilization of two different cargo moving devices on the crane, arranged to handle the containers in series somewhat like the bucket brigades in which volunteer fire fighters passed pails of water forwardly from hand-to-hand. Examples of cargo cranes using these principles are described in the following patents:

| Australian patent | 87428 |
| U.S. Pat. No. | Inventor |
| --- | --- |
| 3,812,987 | Watatani |
| 4,018,349 | Hupkes |
| 4,046,265 | Wormmeester et al |
| 4,172,685 | Nabeshima et al |
| 4,293,077 | Makino. |

In the system disclosed in the Australian patent, there is an elevating platform, but it is served by only one trolley. The systems shown in most of the other listed patents have two trolleys which service a landing platform which is located at a fixed height. It is believed that none of these prior systems is capable of the performance of the present invention, with respect to the reduction of cycle time, and the reduction of distances between the operators and the locations where container movements are made at the ends of container travel.

SUMMARY OF THE INVENTION

According to the invention, a quayside crane has a landing platform, a waterside trolley means for moving cargo between the landing platform and the ship, and a landside trolley means for moving cargo between the landing platform and the dock. The waterside trolley means is operable to lift cargo from and set cargo on the landing platform and ship; and, correspondingly, the landside trolley is operable to lift cargo from and set cargo on the landing platform and dock. The invention resides in the improvement to such apparatus whereby the landing platform is vertically movable to different elevations to change the extent of vertical movement performed on the cargo by the waterside and landside trolleys. This permits the landing platform to be positioned where it will minimize the vertical movement of cargo by the waterside trolley. Preferably, the landside trolley is supported on a horizontal rail which is vertically movable together with the landing platform so there is a constant vertical distance between the landside trolley rail and the landing platform. It is also preferred that the crane be movable longitudinally along the dock, that the waterside trolley be supported on a track which is hinged for movement to a raised storage position where it will not interfere with ships which are approaching and leaving the dock, and that the wire ropes which extend downwardly from the landside trolley diverge in an upward direction to a greater extent than the corresponding ropes on the waterside trolley. This latter feature diminishes the swaying of containers supported by the landside trolley.

The invention also involves certain method aspects which are directly related to the techniques used in connection with the vertically movable landing platform. One method involves a sequence of steps whereby the landing platform is kept at a first elevation while operating the landside and waterside trolleys to place cargo on and remove cargo from the landing platform, subsequently moving the landing platform to a second elevation, and then operating the landside and waterside trolleys to place cargo on and remove cargo from the landing platform while it is at its second elevation.

In one respect, the method involves the step of vertically moving the landing platform to an elevation which corresponds approximately to the higher of the following:

(a) the elevation of the designated location on the ship where the article of cargo is to be loaded or unloaded, or (b) the elevation of the highest obstacle between the dock and the designated location. After the landing platform is at the appropriate height determined by these parameters, the landside and waterside trolleys are operated to move cargo between the dock and the landing platform and to move cargo between the ship and the landing platform.

With respect to cargo which is moved to or from a designated location in the hold of the ship, the method is performed by vertically moving the landing platform to an elevation which corresponds approximately to the elevation of the highest obstacle located between the dock and the designated location. In many instances, this will also be an elevation approximately the same as the elevation of the ship's deck. When the landing platform is adjusted to this position, the waterside trolley is operated to move cargo between the hold and the landing platform, and the landside trolley is operated to move cargo between the dock and the landing platform.

The invention may be constructed and performed in many ways, only one typical example of which is disclosed in this specification. For a more complete understanding of the invention, reference is made to the accompanying drawing and to the following Detailed Description.

BRIEF DESCRIPTION OF THE DRAWING

The figure is a generally diagrammatic view showing the structure and operation of a crane constructed according to the invention.

DETAILED DESCRIPTION

Referring to the drawing, it will be seen that a crane 2 constructed according to the invention is located on a dock 4 to which the container ship 6 is moored. The ship 6 has cargo containers C located both below-deck in its holds and above-deck on the hatch covers 8 and deck area.

The crane has a main frame provided with four vertical legs 10 which support a superstructure 12. For illustrative purposes, the two legs located closest to the viewer are omitted in the drawing, as will be readily understood by persons familiar with cargo handling equipment of this nature. The frame is movable longitudinally along the dock on support wheel assemblies which ride on a set of rails. At an elevated location on the frame, there is a horizontal girder or rail 14, the extremities of which are supported in part by cables 16 and 18 extending downwardly from the peak of the superstructure. Preferably, the rail is hinged at 19 so that it may be raised to a storage position where it will not interfere with ships which are approaching and leaving the dock. A waterside trolley 20 is movable horizontally on the rail, and it has a vertically movable spreader 22 with conventional twist lock mechanisms for engaging the corner structures of standard cargo containers C. The spreader 22 is suspended from the trolley 20 by wire ropes. The trolley 20 and spreader 22 are moved by wire ropes which are driven by motors located inside the machinery house 24. The operation of these motors and the consequent movements of the trolley and spreader are normally controlled by an operator stationed in the control cabin 26. The components described in this paragraph are conventional and are well known in the art.

Also mounted on the frame, there is a vertically movable assembly 27 which includes a landing platform 28, a girder or rail 30, and vertical columns 32 which connect the platform 28 to the rail 30. Two columns 32 are provided, and they are spaced apart to lie adjacent to two legs of the frame so that cargo can move horizontally through the frame from the platform to the ship and vice versa.

The assembly 27 is provided with a set of rollers which ride in vertical trackways 34 and 36 which are affixed to the frame of the crane. Vertical movement of the assembly 27 is produced by wire ropes which are driven by winches located in the machinery house 24. This movement can be controlled by the waterside trolley operator, the landside trolley operator, or both of these individuals.

The vertically movable rail 30 supports a lower trolley 38 which is referred to in this specification as the landside trolley. This trolley has wire ropes which suspend a spreader 40 which has conventional twist lock connectors for engaging the cargo containers C. The drive mechanisms for moving the trolley 38 horizontally and for moving the spreader 40 vertically are located inside the trolley housing. The horizontal movement of the trolley 38 on rail 30 and the vertical movement of the spreader 40 with respect to the trolley are controlled by a landside operator equipped with suitable controls. This operator preferably stands on the dock and is equipped with a hand held control box. Alternatively, the operator may be in a cabin which is immovably attached to the frame, supported on the rail 30 for vertical movement therewith, or supported on the trolley 38 for vertical and horizontal movement.

The spacing between the upper ends of the wire ropes on the landside trolley is preferably greater than the corresponding cable spacing on the waterside trolley. This greater spacing is possible because the landside trolley, unlike the waterside trolley, does not service long, narrow vertical passages between containers as sometimes are encountered when moving containers to or from locations deep in the holds of ships. The wire ropes associated with the landside trolley diverge in an upward direction to a greater extent than the wire ropes on the waterside trolley, thereby diminishing the swaying of containers supported by the landside trolley.

The disclosed crane system has many advantages over conventional single trolley quayside gantry cranes in that the movements of the cargo containers are shared by two trolley systems rather than a single one. The waterside crane operator is located more closely to the landing platform than he is to the dock itself, so some critical manipulations can be observed more accurately than if the cargo engaged by the waterside trolley were landed on and picked up from the dock. The crane system of the invention also has distinct advantages over prior art systems which have two trolleys servicing a landing platform located at a fixed elevation. Specifically, this invention permits the operator to position the landing platform at an elevation which approximates the elevation of the container when it is being moved horizontally by the waterside trolley. This reduces the cycle time of the waterside trolley because it minimizes the time devoted by the waterside trolley to vertical container movement. The vertically movable landing platform will often be at a higher position than a stationary landing platform, so the waterside trolley operator will have a vantage point which permits more precise control of the spreader's movements.

The relative length of the cycle times of the landside and waterside trolleys will vary from situation-to-situation. At some times, the waterside trolley will have a longer cycle time than the landside trolley, whereas the opposite will also occur in some situations. With this in mind, it is envisioned that the apparatus of the invention may be operated in manner which tends to equalize the cycle times of the two trolleys. For example, when the waterside trolley has the longer cycle time, upward movement of the landing platform 28 will tend to equalize the cycle times so that there is a minimum loss of time due to either trolley waiting for the other trolley to complete its cycle.

The controls for the trolley and spreader movements may be computerized to assist the operators of the apparatus. It is envisioned that the controls may memorize the coordinates of the dock, the landing platform, and the occupied and vacant shipboard container locations. These coordinate locations can be updated in response to events such as changes in the landing platform height, the loading or off loading of a container from the ship, or changes in the ship's draft due to loading changes. These coordinates can be important, especially with respect to vertical movement of the containers. The computer may control the descending movement of the loaded or unloaded spreaders, so that the deceleration time can be reduced to a minimum without risking any impact which will damage the spreaders, the containers or their contents. For example, the computer may sense when a descending spreader or container is about two feet above its point of impact. At this time, an automatic deceleration program may be executed so that the descending object decelerates rapidly to substantially zero velocity at the time of impact.

In the course of operating the system, the waterside trolley carries containers between the ship 6 and the landing platform 28. The landside trolley 38 carries containers between the dock 4 and the landing platform 28. It will be appreciated by those skilled in the art that statements made in this specification about movements to and from the dock envision that the container may be landed on or hoisted from transtainers, vehicle beds or other equipment located on the dock.

When containers are being loaded on a ship, the landing platform 28 is moved to an elevation referred to herein as an "advantageous elevation" which corresponds approximately to the higher of the following: (a) the elevation of a designated location on the ship where an article of cargo is to be unloaded or loaded, or (b) the elevation of the highest obstacle between the dock and the designated location. The landside trolley 38 initially delivers the container to the platform 28 by moving vertically up from the dock, then horizontally to a position over the platform 28, and then downwardly a short distance to put the container on the platform 28. The latter step may also be performed by moving the platform upwardly a short distance. In either event, while the spreader 40 returns to fetch another container from the dock, the spreader 22 of the waterside trolley engages the container, lifts it a slight distance to clear the platform 28, then moves it horizontally at a height which safely clears any intervening containers or other obstacles along its path, and then lowers it to the selected shipboard location. Before the waterside spreader 22 returns to the platform 28, the landside spreader 40 has placed another container on the platform 28 and is returning to fetch yet another container from the dock. From time to time, not necessarily with every change in the elevation, of the designated location of each container, the platform 28 is moved vertically to a new advantageous elevation which will reduce the vertical movement required of the waterside spreader during the landside portion of its travel.

Offloading a vessel is essentially the reverse of the procedure described above, except that the containers C are moved from the ship 6 to the landing platform 28, and thence to the dock 4.

When the crane system is being used to load or offload below-deck areas of the ship, i.e. the hold, the procedure is essentially the same as described in the preceding two paragraphs, except that the landing platform is only moved to an elevation which corresponds approximately to the elevation of the highest obstacle between the dock and the container's designated location on the ship. If the decks are cleared and there are no significant, rails, gunwales or other obstacles, the landing platform 28 would be moved to an elevation approximating that of the deck and hatch covers 8. Any lower position of the landing platform would generally be unproductive as it would increase, not reduce, the vertical movement of the waterside spreader 22 when it is located over the landing platform 28.

When it is desired to remove the hatch covers 8 in the course of offloading or in preparation for loading, this task will normally be performed by the waterside trolley 20. The landside trolley rail 30 and landing platform 28 are moved to a low position. The spreader 22 is positioned to engage a hatch cover 8, raise it, and move it horizontally between the legs of the frame to a position which is under the backreach of the rail 14. The hatch cover is then lowered onto a supporting surface where it is released so the trolley can return to load or offload the ship.

By way of example, when it is desired to move a container between the dock and a location 42 on the ship, either in a landward offloading direction or in a waterward loading direction, the platform 28 is preliminarily moved to the advantageous elevation shown in broken lines at 28'. In this situation, the advantageous position is determined by the height of the intermediate containers 44, 45 and 46. The container is moved by one trolley from its initial position on the ship 6 or dock 4 to the landing platform 28, and then it is moved by the other trolley to its destination. If the shipboard location under consideration is the location designated 46, there are no intervening higher containers, so the platform is moved to the advantageous elevation which coincides with the designated cargo location on the ship. The position 28' will suffice for this purpose. Loading or unloading is then performed by the cooperative action of the two trolleys 20 and 38 with respect to this location.

When it is desired to move a container to or remove a container from a location 48 in the hold, the platform 28 is moved to the lower position which is shown in solid lines in the drawing. This location is the approximate elevation of the highest obstacle, i.e. the deck of the ship, located between the dock and the column where the container is located or destined. While the landing platform is at this position, the trolleys 20 and 38 are operated as described above to carry the cargo from the dock to the ship, or vice versa.

From the foregoing, it will be appreciated that this invention provides an extremely versatile system which is capable of significantly speeding up the rate at which cargo is loaded and unloaded from the container ships. The invention may take many forms, only an exemplary one of which is described herein. Therefore, it is emphasized that the invention is not directed only to the disclosed embodiment but is embracing of a wide variety of structures and procedures which fall within the spirit of the following claims.

I claim:

1. In a quayside crane for moving cargo between a dock and a ship, said crane having a landing platform and a waterside trolley for moving cargo between the landing platform and ship, said waterside trolley being operable to lift cargo from and set cargo on said landing platform and ship, said crane also having a landside trolley for moving cargo between the landing platform and the dock, said landside trolley being at a lower elevation than the waterside trolley and being operable to lift cargo from and set cargo on said landing platform and dock, the improvement wherein said landing platform is vertically movable to positions at different elevations for handling different tiers of cargo on the ship and to change the extent of vertical movement performed on the cargo by each of the waterside and landside trolleys.

2. The invention according to claim 1 having a rail for supporting the landside trolley for substantially horizontal movement, said rail being vertically movable with said landing platform so there is a constant vertical distance between the rail and the landing platform.

3. The invention according to claim 1 wherein the waterside trolley is supported on a track which is hinged for movement to a raised storage position where it will not interfere with ships which are approaching and leaving the dock.

4. The invention according to claim 1 wherein the crane is movable longitudinally along the dock.

5. The invention according to claim 1 in which the trolleys include downwardly extending wire ropes which, on the landside trolley, diverge in an upward direction to a greater extent than the wire ropes on the waterside trolley, thereby diminishing the swaying of containers supported by the landside trolley.

6. A method of moving cargo between a dock and first and second tiers on a ship,
   said method being performed by a quayside crane assembly, said crane assembly including a waterside trolley, a vertically movable landing platform, and a landside trolley,
   said method including the steps of keeping the landing platform at a first elevation which is spaced above the dock while operating the landside and waterside trolleys to move cargo between said first tier and the landing platform,
   vertically moving the landing platform to a second elevation which is spaced above the dock, and
   operating the landside and waterside trolleys while the landing platform is at said second elevation to move cargo between the second tier and the landing platform.

7. A method of moving cargo between a dock and a designated location on a ship, said method being performed with a quayside crane assembly which has a landing platform, a waterside trolley for moving cargo between the ship and the landing platform, and a landside trolley for moving cargo between the landing platform and the dock;
   said method including the steps of vertically moving the landing platform to an elevation which corresponds approximately to the higher of the following:
   (a) the elevation of the designated location in a tier on the ship where an article of cargo is to be unloaded or loaded, or
   (b) the elevation of the highest obstacle between the dock and the designated location in said tier, and operating said landside and waterside trolleys when the landing platform is at said elevation to move cargo between the dock and the landing platform and between the landing platform and the designated location in said tier on the ship.

8. A method of moving cargo between a dock and a designated location in the hold of a ship,
   said method being performed by a quayside crane assembly, said crane assembly having a landing platform, a waterside trolley for moving cargo between the ship and the landing platform, and a landside trolley for moving cargo between the landing platform and the dock;
   said method including the steps of vertically moving the landing platform to an elevation which corresponds approximately to the elevation of the highest obstacle located between the dock and the designated location, operating said waterside trolley to move cargo between the designated location and the landing platform when the landing platform is at said elevation, and operating the landside trolley when the landing platform is at said elevation to move cargo between the dock and the landing platform.

9. The method of claim 8 including also the steps of operating the landside and waterside trolleys to move an article of above-deck cargo between the ship and the dock, said article of above-deck cargo being located at a second designated location on the ship, said method including the step of vertically moving the landing platform to a second elevation which corresponds approximately to the higher of the following:
   (a) the elevation of the second designated location in an above-deck tier on the ship where an article of cargo is to be unloaded or loaded, or
   (b) the elevation of the highest obstacle between the dock and the second designated location in said tier,
   and operating said landside and waterside trolleys when the landing platform is at said second elevation to move cargo between the dock and the landing platform and between the landing platform and the second designated location in said tier on the ship.

* * * * *